Sept. 7, 1937.　　　　E. DOZLER　　　　2,092,642
BRAKING SYSTEM
Filed Jan. 20, 1936
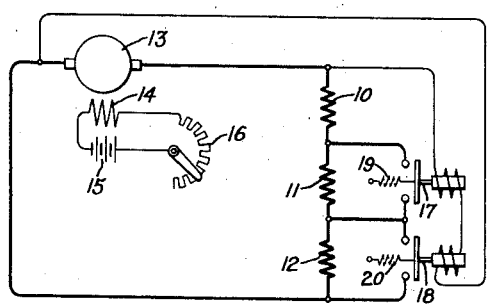
Inventor:
Ernst Dozler,
by Harry E. Dunham
His Attorney.

Patented Sept. 7, 1937

2,092,642

UNITED STATES PATENT OFFICE 2,092,642

BRAKING SYSTEM

Ernst Dozler, Berlin-Charlottenburg, Germany, assignor to General Electric Company, a corporation of New York Application January 20, 1936, Serial No. 59,989
In Germany January 19, 1935

6 Claims. (Cl. 188—159)

My invention relates to braking systems for electrically driven vehicles, more particularly to systems of braking in which electromagnetic brakes are utilized to exert a retarding force on the vehicle and has for an object the provision of a simple and reliable braking system of this character.

It has heretofore been proposed to supply electromagnetic brakes, such for example as rail brakes or eddy current brakes, from a separate source of energy, such as a battery, or from the traction motors of the vehicle acting as series excited generators. The use of a battery as the primary source of supply for the electromagnetic brakes has been found rather unsatisfactory, however, because of the extreme size and expense of the battery. Not only does such a battery take up a great deal of room on a vehicle and considerably increase the weight of the vehicle, but the battery, when so used, is subjected to frequently occurring injurious overloads.

The use of the traction motors of the vehicle, operating as series generators to supply the electromagnetic brakes, is only satisfactory when the motors themselves are to be used for dynamic or regenerative braking purposes. Otherwise, relatively expensive auxiliary apparatus must be provided for controlling the motors during the braking operation. In many types of vehicles, for example, gas-electric vehicles, it may not be desirable to employ dynamic braking arrangements. Accordingly, it is a further object of my invention to provide a braking system for an electric vehicle in which the traction motors are utilized to excite the electromagnetic brakes without recourse to the relatively expensive control devices necessary to provide dynamic braking.

In carrying out my invention in one form, I provide an electromagnetic braking system in which the field windings of the driving motors are separately excited from a relatively small battery and the electromagnetic brakes are connected for energization from the traction motors operating as separately excited generators. A suitable control device is provided for adjusting the excitation of the driving motors so that the proper voltage is supplied to the electromagnetic brakes and, when several electromagnetic brakes are provided, I provide means responsive to the speed of the vehicle for selectively cutting out the electromagnetic brakes in sequence as the speed of the vehicle decreases.

For a more complete understanding of my invention, reference should now be had to the drawing, the single figure of which is a diagrammatic illustration of a braking system for an electric vehicle embodying my invention.

Referring now to the drawing, I have shown a plurality of energizing brake windings 10, 11, and 12, which represent somewhat diagrammatically a plurality of electromagnetic brakes for applying a retarding force to the electric vehicle (not shown). These brake windings are preferably connected as shown in series circuit relation with each other and with the armature 13 of a traction motor which is provided with a field winding 14 arranged to be separately excited from a battery 15 through a control device or rheostat 16.

Although only the connections established for braking operation are shown, it will be understood that for motoring operation, the armature 13 and the field winding 14 may be connected in any well known manner to a suitable source of supply for operation as a motor to drive the vehicle. During braking operation, with the braking connections established as shown, it will be understood that the vehicle drives the traction motor for operation as a separately excited generator to supply energy to the brake windings 10, 11, and 12. In order to provide the proper braking effort for different values of load, the rheostat 16 may be operated to adjust the excitation of the field winding 14 and thus control the voltage supplied to the electromagnetic brakes.

It will, of course, be apparent that only a small amount of energy is necessary for the excitation of the motors and accordingly, the battery 15 may be relatively small. Consequently, it is possible to use a small lighting battery such as is usually available on an electric vehicle. Furthermore, there is no possibility of dangerously overloading the battery.

Thus it will be seen that the excitation energy for the electromagnetic brake is obtained from the energy of movement of the train through the traction motor operating as a separately excited generator. Since the energy supplied to the electromagnetic brakes is small, the braking effort exerted by the driving motors themselves is negligible and accordingly a considerably smaller traction motor may be used than is necessary in installations in which the driving motors are used for dynamic braking purposes.

With the electromagnetic brakes connected in series circuit relation as shown, the voltage of the traction motor may be decreased as the speed of the vehicle decreases to a value which is lower than the value of voltage necessary effectively to excite the electromagnetic brakes. Accordingly, I provide means for sequentially short-circuiting certain of the electromagnetic brakes as the speed of the vehicle decreases.

As shown, the electromagnetic brakes 11 and 12 are respectively provided with voltage responsive short-circuiting switches 17 and 18, the energizing windings of which are connected for energization in accordance with the voltage across the armature 13. As shown, the short-circuiting switch 17 is normally biased to its closed circuit position by a spring 19 and the short-circuiting switch 18 is normally biased to its closed circuit position by a spring 20.

Since the traction motor operates as a separately excited generator during the braking operation, it will be apparent that the voltage produced by the traction motor, assuming a constant excitation of the field winding 14, constitutes a reliable measurement of the speed of the vehicle. Thus, it will be seen that when the braking connection is first established with the vehicle operating at a relatively high speed, a relatively high voltage will be generated by the traction motor and accordingly the short-circuiting switches 17 and 18 will be operated to the respective open circuit positions shown against the biasing springs 19 and 20.

As the vehicle gradually slows down, however, under the retarding force exerted by the electromotive brakes 10, 11, and 12, the voltage across the armature 13 will correspondingly decrease and upon attainment of a predetermined armature voltage, the short-circuiting switch 18 will close, thereby short-circuiting electromagnetic brake 12. It will be understood, of course, that the short-circuiting switch 18 is adjusted to drop out at a value of voltage which is slightly above the minimum value of voltage necessary effectively to excite the three electromagnetic brakes when connected in series circuit relation. As soon as the electromagnetic brake 12 is short-circuited, it will be apparent that the voltage existing across the armature 13 will be sufficient properly to excite the electromagnetic brakes 10 and 11 and accordingly the vehicle will be further decelerated.

As the vehicle continues to slow down, the voltage across the armature 13 continues to decrease, and at a somewhat lower predetermined value of voltage the short-circuiting switch 17 will close and short-circuit the electromagnetic brake 11. Thus, it will be seen that by sequentially short-circuiting certain of the electromagnetic brakes, the retarding force exerted on the vehicle is maintained until the vehicle has reached a very low speed.

While I have shown a particular embodiment of my invention, it will be understood, of course, that I do not wish to be limited thereto since many modifications may be made and I therefore contemplate by the appended claims to cover any such modifications as fall within the true spirit and scope of my invention.

What I claim as new and desire to secure by Letters Patent of the United States is:

1. In an electric vehicle, the combination of a traction motor arranged to be driven as a generator during braking operation, a plurality of electromagnetic brakes connected for energization in series circuit relation with the armature of said traction motor, means including a separate source of energy for exciting the field of said traction motor during said braking operation, and means responsive to the speed of said vehicle for sequentially short-circuiting said electromagnetic brakes as the speed of the vehicle decreases.

2. In an electric vehicle, the combination of a traction motor arranged to be driven as a generator during braking operation, a plurality of electromagnetic brakes connected for energization in series circuit relation with the armature of said traction motor, means including a separate source of energy for exciting the field of said traction motor during said braking operation, and means responsive to the voltage produced by said traction motor for sequentially short-circuiting said magnetic brakes as the speed of said vehicle decreases.

3. In an electric vehicle, the combination of a traction motor arranged to be driven as a generator during braking operation, a separate source of energy for exciting the field of said traction motor during said braking operation, a plurality of electromagnetic brakes connected for energization in accordance with the voltage produced by said traction motor operating as a generator, and means responsive to the speed of said vehicle for sequentially deenergizing said electromagnetic brakes as the speed of said vehicle decreases.

4. In an electric vehicle the combination of a traction motor arranged to be driven as a generator during braking operation, a plurality of electromagnetic brakes connected for energization in series circuit relation with the armature of said traction motor, connections for exciting the field of said traction motor from a separate source during said braking operation, and means responsive to the speed of said vehicle for controlling the connections between at least one of said electromagnetic brakes and said series circuit.

5. In an electric vehicle the combination of a traction motor arranged to be driven as a generator during braking operation, a plurality of electromagnetic brakes connected for energization in series circuit relation with the armature of said traction motor, connections for exciting the field of said traction motor from a separate source during said braking operation, and switching means responsive to the speed of said vehicle for controlling said series circuit to eliminate from said circuit at least one of said electromagnetic brakes as the speed of the vehicle decreases.

6. In an electric vehicle the combination of a traction motor arranged to be driven as a generator during braking operation, a plurality of electromagnetic brakes connected for energization in series circuit relation with the armature of said traction motor, connections for exciting the field of said traction motor from a separate source during said braking operation, and means responsive to the speed of said vehicle for short circuiting at least one of said electromagnetic brakes as the speed of the vehicle decreases.

ERNST DOZLER.